United States Patent
Steinlin et al.

(10) Patent No.: US 12,285,820 B2
(45) Date of Patent: *Apr. 29, 2025

(54) METHOD, CONTROL UNIT AND LASER CUTTING SYSTEM FOR COMBINED PATH AND LASER PROCESS PLANNING FOR HIGHLY DYNAMIC REAL-TIME SYSTEMS

(71) Applicant: BYSTRONIC LASER AG, Niederönz (CH)

(72) Inventors: Markus Steinlin, Zürich (CH); Titus Haas, Zofingen (CH)

(73) Assignee: BYSTRONIC LASER AG, Niederönz (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/887,096

(22) Filed: Sep. 17, 2024

(65) Prior Publication Data
US 2025/0001527 A1 Jan. 2, 2025

Related U.S. Application Data

(63) Continuation of application No. 18/248,625, filed as application No. PCT/EP2021/078619 on Oct. 15, 2021.

(30) Foreign Application Priority Data

Oct. 16, 2020 (EP) .................................. 20202334

(51) Int. Cl.
*B23K 26/38* (2014.01)
*B23K 26/03* (2006.01)
(Continued)

(52) U.S. Cl.
CPC .............. *B23K 26/38* (2013.01); *B23K 26/03* (2013.01); *G05B 19/182* (2013.01);
(Continued)

(58) Field of Classification Search
CPC .... B23K 26/38; B23K 26/03; B23K 2101/18; B23K 2101/06; G05B 19/182; G05B 2219/36199
See application file for complete search history.

(56) References Cited

U.S. PATENT DOCUMENTS

| | | | |
|---|---|---|---|
| 11,467,561 B2 | 10/2022 | Wittwer | |
| 2015/0165549 A1 | 6/2015 | Beutler | |

(Continued)

FOREIGN PATENT DOCUMENTS

| | | | |
|---|---|---|---|
| CN | 101862909 A | 10/2010 | |
| CN | 102056705 A | 5/2011 | |

(Continued)

OTHER PUBLICATIONS

International Search Report and Written Opinion, mailed Feb. 10, 2022, from PCT/EP2021/078619 10 pages.

(Continued)

*Primary Examiner* — Robert E Fennema
*Assistant Examiner* — Olvin Lopez Alvarez
(74) *Attorney, Agent, or Firm* — Workman Nydegger

(57) ABSTRACT

A control unit for calculating a spatially and time-resolved, combined setpoint data set for control of a laser cutting process includes a measurement data interface for accessing sensor data during the cutting operation, a process interface to a first memory that stores a process model that estimates status data of the laser cutting process and a cutting result, a machine interface to a second memory in which a machine model is stored which represents a kinematic behaviour of the laser cutting head and estimates status data of a movement process and the cutting result thereof, and a processor that executes an algorithm that couples the process model and the machine model via a feed rate value and/or via a nozzle spacing value. The processor accesses the process (Continued)

model and the machine model in order to calculate the spatially and time-resolved, combined setpoint data set with coordinated setpoints.

16 Claims, 8 Drawing Sheets

(51) Int. Cl.
  *G05B 19/18* (2006.01)
  *B23K 101/06* (2006.01)
  *B23K 101/18* (2006.01)
(52) U.S. Cl.
  CPC ...... *B23K 2101/06* (2018.08); *B23K 2101/18* (2018.08); *G05B 2219/36199* (2013.01)

(56) References Cited

U.S. PATENT DOCUMENTS

| 2020/0130107 A1 | 4/2020 | Mochizuki |
| 2022/0043421 A1 | 2/2022 | Wittwer |

FOREIGN PATENT DOCUMENTS

| CN | 102741009 A | 10/2012 |
| CN | 104907700 A | 9/2015 |
| CN | 107378232 A | 11/2017 |
| CN | 110039190 A | 7/2019 |
| DE | 102016104318 B3 | 4/2017 |
| EP | 3671373 A1 | 6/2020 |
| EP | 4146429 B1 | 3/2024 |
| GB | 2378261 A | 2/2003 |
| WO | 0139919 A1 | 6/2001 |

OTHER PUBLICATIONS

International Preliminary Report on Patentability, mailed Oct. 6, 2022, from PCT/EP2021/078619 13 pages.
Kaplan, A F H, "An Analytical Model of Metal Cutting with a Laser Beam", Journal of Applied Physics, American Institute of Physics, US, vol. 79, No. 5, Mar. 1, 1996, pp. 2198-2208 pp. 12.
Wikipedia, "State-space representation", Dec. 9, 2022 (page last edited) 12 pages.
HAAS, Titus, "Set Point Optimisation for Machine Tools", ETH Zurich Verlag, May 2018 172 pages.
N. Lanz, D. et al., "Efficient Static and Dynamic Modelling of Machine Structures with Large Linear Motions," International Journal of Automation Technology, vol. 12, pp. 622-630, Aug. 7, 2018 pp. 9.
J. Zeng, et al., "The Abrasive Waterjet as a Precision Metal Cutting Tool," 10th American Waterjet Conference, 1999 15 pages.
J. Zeng, "Mechanisms of brittle material erosion associated with high-pressure abrasive waterjet processing: A modeling and application study," Doctoral Thesis, 1992 247 pages.
W. Schulz, et al., "Simulation of Laser Cutting", Springer Netherlands, 2009 49 pages.
M. Brügmann, et al., "Optimization of Reactive Gas Laser Cutting Parameters based on a combination of Semi-Analytical modelling and Adaptive Neuro-Fuzzy Inference System (ANFIS)," Lasers in Manufacturing Conference, 2019 6 pages.
M. Brügmann, et al., "A theoretical model for reactive gas laser cutting of metals," Lasers in Manufacturing Conference, 2019 10 pages.
Liu et al. "Virtual NC laser cutting machine tool and cutting process simulation", Proceedings of SPIE 5444, 4th International Conference on Virtual Reality and Its Applications in Industry, Mar. 19, 2004, 7 pages.
Chinese First Office Action, mailed Oct. 14, 2023, from Chinese App. No. 202180080759.9, 12 pages.
Chinese Decision to Grant, mailed Jan. 12, 2024, from Chinese App. No. 202180080759.9, 3 pages.

METHOD, CONTROL UNIT AND LASER CUTTING SYSTEM FOR COMBINED PATH AND LASER PROCESS PLANNING FOR HIGHLY DYNAMIC REAL-TIME SYSTEMS

The present invention is in the field of laser cutting technology and relates in particular to a method for calculating a spatially and time-resolved, combined setpoint data set for open- and/or closed-loop control of a laser cutting process, in particular for cutting metal sheets and tubes, a corresponding control unit and a laser cutting system.

A laser system, in particular for cutting metal sheets and tubes, with powers generally >4 kW is a highly complex system and comprises several physical and mechanical components that are controlled in a suitable manner and in particular electronically via appropriate actuators, such as for example a laser cutting head or a transport system for the workpiece to be cut. These components have to be moved as part of the cutting process. Since some of these components have a high mass (e.g. approx. 15-20 kg for a cutting head and approx. 400 kg for the bridge carrying the cutting head and approx. 70 kg for the carriage), it is important, when moving them to execute the cutting operation, to be able to take sufficient account of inertial forces, in order to be able to ensure a sufficiently high quality cutting operation.

In the prior art, e.g. in US2015/165549 A1, methods are known for providing measures to improve the quality of the cutting operation, such as for example controlling primary and/or secondary process parameters on the basis of acquired sensor data, for example photodiode signals or camera images, which record a state of the process zone.

The measures known in the prior art mainly focus on the physical processes of the cutting process. The kinematic processes are disadvantageously not taken into account. However, this can lead to a loss of quality, for example if a rapid change in the feed rate, typically for corners and small radii, is imperative, so that high inertial forces are activated, which can lead to contour errors in the cutting process or other quality losses.

Furthermore, predictive control (Model Predictive Control-MPC) is known in principle. In this method, optimal setpoint values are determined on the basis of a model. The setpoint values are based on model assumptions and current measured values. The optimum can be defined by a target preset. Such applications are successfully used in chemical plants, for example. Predictive control, MPC, is also used for various academic path planning problems. When implementing MPC for machine tools, the high cycle rates and high complexity represent an obstacle to real-time capability.

In order to improve the process stability as well as the productivity of the laser cutting process in the field of cutting metal sheets and tubes, there is a need for a solution which allows coordinated control of the process setpoints and the path setpoints through holistic setpoint definition, i.e. taking into account the physical laser cutting process and the kinematic movement process. If, for example, the process feed rate has to be reduced because the path cannot be traversed quickly enough at points with high curvature (inputs from the kinematic process), the process setpoints (physical process) need to adjust automatically accordingly. If, in another example, the process feed rate has to be reduced because the process cannot blow out the melt quickly enough (inputs from the physical process), the path setpoints (kinematic process) also need to be adjusted independently or automatically.

The object of the present invention is therefore to improve the quality of the laser cutting operation while ensuring the highest possible process stability and productivity. In addition to the physical states of the laser cutting process, kinematic states of the moving masses, in particular of the laser cutting head and/or the bridge that supports it or other components of the laser cutting machine, should in particular also be taken into account when controlling the laser cutting process. The states of the laser cutting process include the state of the cutting head, e.g. degree of contamination, thermal effects of the optics and the beam path and environmental parameters, including humidity, temperature, air pressure, etc.

In a first aspect, the invention relates to an (at least partially computer-implemented) method for calculating a spatially and time-resolved, combined setpoint data set for open- and/or closed-loop control (i.e. for control without feedback and/or regulation with feedback) of a laser cutting process of a laser cutting machine with a laser cutting head during laser cutting, in particular of metal sheets or tubes, with the following method steps:

measuring sensor data during the cutting operation;
providing a process model stored in a first memory that represents and/or models the laser cutting process and estimates status data of the laser cutting process and in particular a cutting result resulting therefrom (and optionally also indirect process parameters, i.e. parameters of the cutting process that result from the settings, such as contour deviations or a kerf width);
providing a machine model stored in a second memory that represents and/or models the kinematic behaviour of the laser cutting head (or higher-level mechanical structures of the laser cutting machine, such as for example a mobile support such as for example a bridge) during movement thereof and estimates status data of a movement process and in particular the cutting result resulting therefrom (especially with contour deviations);
the process model and the machine model being coupled, in particular being coupled via a feed rate value for the laser head and/or via a nozzle spacing value;
accessing the process model in the first memory and the machine model in the second memory by a control unit, in order, on the basis of the estimated status data of the laser cutting process and the movement process, to calculate the spatially and time-resolved, combined setpoint data set with coordinated setpoints for the laser cutting process and setpoints for the movement process, taking into account the read-in sensor data.

With the method presented here, significant advantages can be achieved. For instance, the quality of the cut parts can be increased, in particular taking into account the current process conditions (machine, wear, component service life etc.). In addition, the proportion of incorrectly cut components or rejects can be reduced. By using specific models and associated algorithms, the quality and/or any contour errors can even be estimated in advance and productivity can be increased. This is made possible, among other things, by the fact that quality deviations (through the coupling of the process and machine model) can be recognized and avoided in advance.

The setpoint data set is spatially and time-resolved. This means that the setpoint data set is specific to a position on the path or geometry specified by the cutting plan (as the three-dimensional description of the workpiece or component to be cut) and specific to a point in time during laser cutting and thus during the processing of the geometry over time (trajectory). The setpoint data set is space and time dependent. The setpoint data set is generated dynamically for each position and each time point.

The mathematical derivatives of the path-related parameters are represented in well-known systems of equations for position, speed, acceleration and jerk.

The setpoint data set is "combined" insofar as it compares and outputs in a combined or coordinated manner both setpoints for the laser cutting process for driving the components of the laser cutting machine (e.g. feed rate, cutting gas etc.) and setpoints for driving the actuators or drive units for moving the cutting head. Thus, setpoint data sets for laser cutting and for movement of the laser cutting head are not generated individually and independently, but rather a common, holistic setpoint data set is calculated that combines and takes into account both aspects (laser cutting and mechanics of the moving masses). The setpoint data set thus contains inputs for two different processes, namely for the laser cutting process and for moving the laser cutting head. In particular, the delays of the various mechanical components and/or subsystems are taken into account in the calculation. Depending on the position of the laser cutting head on the specified trajectory, different setpoint values are calculated. Depending on the point in time at which the laser cutting head is at a point on the trajectory, different setpoint values are calculated. The calculated setpoint data set is therefore space and time dependent.

The quality (for example the burr height) can advantageously be estimated using a physical process model (for example Weber number). The cutting parameters are optimally adjusted based on the model estimation. The Weber number may, for example, preferably be kept constant in corners and radii, which means that, for example, the focal position has to be adjusted.

The setpoint data set is multidimensional and usually comprises several data sets for the individual parameters to be open-/closed-loop controlled, such as the focal position, the feed rate, the nozzle spacing. The setpoint data set is passed on to the respective actuators, which then drive or control the corresponding components of the laser cutting machine.

With the combined setpoint data set open- and/or closed-loop control of the laser cutting process can thus advantageously take place as a function of the respective geometry (and/or by reference currently also of the trajectory). For example, straight sections can be controlled differently, and in particular executed more quickly than curved sections (especially with tight curvatures/radii) in order to ensure a consistent work result. The work result can be entered in advance as an input by the user via a user interface as a data set.

With the combination of the process model and the machine model for the combined calculation of the setpoint data set, it is possible to calculate a setpoint data set which not only improves the cutting quality (as per the process model), but also, for example, reduces/limits contour errors and/or reduces/restricts machine excitations (as per the machine model; minimal vibrations within the tolerance range are conceivable). The setpoint data set can thus be calculated in such a way that target variables such as contour error minimization, machine excitation minimization, minimum jerk can be achieved.

The two models, the process model and the machine model, are coupled. This is achieved by providing a transformation rule that makes it possible to convert inputs from one model into inputs for the other. The process model for laser cutting is based on physical formulae that take into account hydrodynamic parameters in particular, such as for example the Weber number. Coupling of the two models is preferably achieved via the spatially/time-resolved cutting speed. On the one hand, this depends on the dynamic limits made available or set for the machine axes. The smaller the dynamic limits (acceleration and/or jerk), the slower the feed rate (desired cutting speed) is achieved. This is primarily the case when starting, stopping, in corners and with small radii. This is taken into account by the machine model. The cutting speed, on the other hand, depends on the cutting process. The cutting process limits the maximum cutting speed in a spatially and time-resolved manner. In this respect, the cutting speed also cannot be changed as quickly as desired (for example focal position adjustment dynamics or gas dynamics). These relationships are mapped with the process model. Among other things, the two models are also coupled via the nozzle spacing or the ambient conditions. The dynamic limits (acceleration, jerk etc.) not only influence the dynamically induced contour errors (part accuracy), but also the current cutting speed, which in turn has an influence on cutting quality. It is assumed that the contour error increases with increasing dynamics and that the cutting quality depends on the cutting speed.

The sensor data can preferably come from a large number of different sensors, measuring transducers or probes. The sensor data can be of an optical nature and thus come, for example, from differently positioned photodiodes and/or at least one camera. The sensor data can also represent an acoustic signal, in particular during laser cutting. Furthermore, the sensors can sometimes take the form of spectral intensity sensors (properties of the melt such as temperature, viscosity, plasma, material properties), temperature sensors along the optical path up to the sheet metal, pressure and humidity sensors for cutting gas and/or sensors for identifying the movement of the laser cutting head (for example speed sensors, acceleration sensors, etc.).

The sensor data can be used for different functions or purposes. On the one hand, the sensor data can be used to calibrate the two models, the process model and/or the machine model. On the other hand, the sensor data can be used alternatively or cumulatively for or in a fast control loop in order to control the laser cutting process together with the feed rate on the basis of the acquired sensor data. For this purpose, the sensor data are fed back or transferred to a control unit, which is intended to determine deviations between the results estimated by the machine model and/or the process model (in the form of status data, in particular an estimated cutting result) and the actually measured results or values that represent a cutting result (in the form of the sensor data). In the event of deviations between the model estimation and measurement, a model update is carried out automatically, in particular to reduce the deviations.

The process model focuses on the quality of the cutting result (edge roughness, scoring, burr formation and/or wavy cut). The machine model focuses on contour errors and machine excitation.

In the context of this invention, cutting quality is estimated using a process model (for example: burr height, roughness). The sensor feedback (measurement of burr height, roughness) reduces deviations between model estimation and measurement. The kerf width is also estimated cumulatively with the model. By measuring the kerf width, the deviation between the model and reality can be reduced. It is generally provided that the model-estimated state is compared with the measured actual state in order to adjust the model in the event of deviations. As a result, the deviations can be reduced by the model update.

Both the laser cutting process and the movement process for the laser cutting head are multivariable, highly dynamic processes. In principle, a highly dynamic movement (here of the laser head/laser cutting head) can cause contour errors in the cut workpiece that are no longer within the tolerance range. By combining the two dynamic models (machine and process) as proposed here, these errors can be estimated and compensated in advance, in the case of given parameters, without these errors actually occurring and rejects possibly being produced. The machine model can, for example, provide a numerical output that indicates that the dynamics (speed, acceleration and/or jerk) should be reduced or the axis positions should be slightly adjusted using automatically generated control commands in order to meet the required tolerance requirements. The machine model can also generate control commands in order to control the other mechanical components of the laser cutting machine, such as for example the bridge, accordingly (keyword: vibrating bridge, resonance vibration). The laser cutting head is typically arranged on a bridge as a support structure. The machine model can then include a description of the bridge and thereby also describes components attached to it, such as the cutting head.

The machine model simulates the entire movement behaviour of the laser cutting head. The machine model is thus based on kinematic equations of the laser cutting head and takes into account the inertia of the moving mass of the laser cutting head. The laser cutting head can be mounted on a support structure, for example a bridge, in order to carry out the movement. The laser cutting head with its support structure are mechatronic components that can be addressed electronically. The machine model thus models the kinematic behaviour of the bridge with the laser cutting head during laser cutting. The machine model simulates the (physical) movement parameters (e.g. speed, acceleration, jerk) with which the laser cutting head moves on the trajectory specified by the cutting plan. Furthermore, the machine model simulates deviations from the specified trajectory and, in particular, also compliance with preconfigurable tolerance deviations. The machine model represents changes in movement behaviour that result, for example, from the inertia of the moving mass. The machine model can in particular be used to predict or estimate the physical movement parameters. The following input data are fed to the model for calculation: positions (target and actual), speeds (target and actual), accelerations (target and actual), jerks (target and actual). Additional input data can optionally be taken into account, such as: temperatures of the drives, acceleration sensors (on the head and other significant locations on the machine structure) and/or model correction values that result from a model update. The machine model can be used to estimate future status data of the movement process and in particular a work result resulting therefrom or due thereto. The work result can also contain errors, for example, so that "errors" such as contour errors or contour deviations (possibly still within the tolerances) and/or quality losses can be estimated in advance. For example, too high a feed rate, in the case of a large mass of the laser cutting head and the bridge optionally supporting it, can result in vibrations that have a negative impact on cut quality (e.g. wavy cut). This can advantageously be ruled out with the solution proposed here.

A 4th order model in state space representation can be used as an example for the machine model (Titus Haas, "Set Point Optimisation for Machine Tools", ETH Zurich Verlag, 2018, available for download at: doi.org/10.3929/ethz-b-000271470):

With this model, the tool centre point (TCP) position can be modelled in order to estimate dynamically induced deviations from the target geometry. In general, the machine model consists of a set of (ordinary) differential equations.

In a preferred embodiment of the invention, which machine model is to be used from a set of machine models can be configured in a configuration phase. Different machine models can therefore be used depending on the application. In principle, this can be done independently of the process model. This determination of the machine model can, however, also take place taking into account the process model. In particular, the machine model can also be determined without estimating contour deviations in the cutting result, such as, for example, two-mass oscillators (or "double integrator"). An important feature of the invention can be seen in the coupling of the models via the speed and the nozzle spacing.

The term "cutting result" refers to the (estimated and/or determined) work result of the laser cutting operation. The determined work result is encoded in the acquired sensor data (e.g. as measured kerf width or as cut front inclination, as time value/performance etc.). The work result or cutting result is thus related to the respective cut part. The work result can contain information about possible deviations from NOMINAL (preconfigurable setpoint values) and/or errors of various types. These include, for example, contour deviations (within or outside the tolerance limits) and/or quality losses, such as high edge roughness, scoring, burr formation and/or a wavy cut. The work result can be available and processed as a digital data set with different parameters.

The process model simulates the laser cutting process, especially of metal sheets and tubes, with a laser power of over 4 kW. The process model thus relates to the entire cutting process during the cutting operation. The process model simulates the physical laser parameters during laser cutting (for example process parameters such as focal position, gas pressure, nozzle spacing, laser power; but also quality features such as edge roughness, scoring etc. as well as setting parameters such as laser cutting speed for example). The process model can be used to estimate the quality of the cut part. The cutting parameters are optimally set based on this estimate. The process model can thus be used to estimate future status data of the cutting process and, in particular, to estimate a future work result (cutting quality with different quality features). For further details about a process model, reference is made to the following literature:

AFH Kaplan, "An analytical model of metal cutting with a laser beam," Journal of Applied Physics, vol. 79, no. 5, pp. 2198-2208, 1996.

M. Brügmann, M. Muralt, B. Neuenschwander, S. Wittwer and T. Feurer, "A theoretical model for reactive gas laser cutting of metals," Lasers in Manufacturing Conference, 2019.

M. Brügmann, M. Muralt, B. Neuenschwander, S. Wittwer and T. Feurer, "Optimization of Reactive Gas Laser Cutting Parameters based on a combination of Semi-Analytical modelling and Adaptive Neuro-Fuzzy Inference System (ANFIS)," Lasers in Manufacturing Conference, 2019.

W. Schulz, M. Niessen, U. Eppelt and K. Kowalick, Simulation of Laser Cutting, Springer Netherlands, 2009.

J. Zeng, "Mechanisms of brittle material erosion associated with high-pressure abrasive waterjet processing: A modeling and application study," Doctoral Thesis, 1992.

J. Zeng, J. Olson and C. Olson, "THE ABRASIVE WATERJET AS A PRECISION METAL CUTTING TOOL," 10th American Waterjet Conference, 1999.

For the machine model, reference is made to N. Lanz, D. Spescha, S. Weikert and K. Wegener, "Efficient Static and Dynamic Modelling of Machine Structures with Large Linear Motions," International Journal of Automation Technology, Vol. 12, pp. 622-630, 2018 and to Titus Haas, "Set Point Optimisation for Machine Tools", ETH Zurich Verlag, 2018, available for download at: doi.org/10.3929/ethz-b-000271470.

The machine model simulates the mechanical components of the laser cutting machine, in particular the laser cutting head and the cutting bridge, during movement and, among other things, laser head path planning. As with classic path planning, the properties of the drive train, e.g. maximum acceleration and braking ramps of the axes and the maximum feed rate of the process, are taken into account. In some cases, the setpoint path can also be rounded using geometric rules (computing time advantage). According to the invention, the dynamic properties of the machine are also taken into account. The method described here can, however, further optimize the trajectory with an optimization algorithm and together with the machine model. The specified geometric tolerance is here fulfilled, taking into account the dynamic properties of the machine (inertia and flexibility of the components):

the geometric setpoint is adjusted in such a way that the modelled dynamic deviations come to lie within the tolerance band;
reduction of acceleration where necessary;
increase in acceleration where possible;
geometric compensation of the expected deviation.

The process model and/or the machine model can preferably be implemented as a neural network. The neural network can be, for example, a convolutional neural network (CNN). The neural network may have been trained with a training algorithm on the basis of annotated or partially annotated training data. The training algorithm can be a supervised learning method or a semi-supervised learning method. The training algorithm can be based on historical data. Reinforcement learning methods can also be used for the model update or adjustment of the models. Reinforcement learning makes it possible to find solutions to this complex problem without initial data and (prior) knowledge of the laser cutting process. In addition, reinforcement learning does not require demanding collection and processing of training data.

The process model can be used to predictively calculate or estimate the resulting quality (e.g. burr) of the cutting process. An optimizer (trained to execute the optimization algorithm) finds process parameters that meet the quality requirements. The term "process parameters" relates to a subset of the setpoint values calculated according to the invention from the combined setpoint data set. The process model and the machine model are directly linked to one another (e.g. speed reduction in the corner of the contour or in the case of radii in order to keep the quality constant).

In a preferred embodiment, the process model and/or machine model is/are designed such that future states of the laser cutting process and/or future states of the movement process, in particular future positions on the trajectory of the laser cutting head, can be estimated in advance.

The status data of the movement process can preferably include a laser cutting head feed rate. The status data of the movement process can also include acceleration and/or jerking of the laser cutting head or other machine components of the laser cutting machine.

The status data of the laser cutting process can preferably include all or selected parameters that are relevant to the laser cutting process, such as for example the above-mentioned process parameters, namely, for example, focal position, gas pressure, nozzle spacing, laser power.

In a preferred embodiment of the invention, the method further comprises:

acquisition of a target input entered on a user interface for calculating a cost function, on the basis of which the combined spatially and time-resolved setpoint data set is calculated, the target input comprising several interdependent inputs, in particular a cutting quality input, a cutting operation robustness input and a productivity input.

In a preferred embodiment, the different inputs are assigned different weightings. This makes it possible to weight the different inputs for the work result depending on the preference of the customer (user). The user interface is preferably a graphical user interface that includes buttons. In this case, one of the buttons is designed as a multidimensional input button, via which the different interdependent target inputs can be acquired with just one user input. The input button is designed in such a way that it represents the dependencies between the individual target inputs. For example, if the user selects a high value as the cut quality input and thus as an input for the work result, they can only specify admissible inputs for productivity, i.e. productivity inputs that are compatible with the input effected for the cut quality or that can be physically implemented. Inadmissible or incompatible target inputs can thus be avoided (such as for example high cutting quality, high robustness and high productivity). In the event of an inadmissible combination, a message with an error signal is advantageously output directly on the user interface, which indicates to the user that they must select other inputs. Overall, this can improve the reliability and safety of the method or system.

In a further advantageous embodiment of the invention, the combined spatially and time-resolved setpoint data set can comprise setpoint values for direct process variables such as cutting speed, acceleration of the laser cutting head, laser power, focal position, pulse pattern (in particular pulse width and frequency), nozzle spacing, gas pressure, BPP (beam parameter product), focal diameter and/or gap width and/or setpoint values or values for indirect process variables, such as scattered radiation, quality features, gap width, inclination of the cutting edge, temperature distribution in a cutting zone. This enables control of the indirect process variables (such as kerf width, inclination of the cutting edge, scattered radiation, quality features).

In a further advantageous embodiment of the invention, the method can apply a fast control loop to a first class of rapidly controllable parameters, which controls the laser cutting process together with the feed rate of the laser cutting head on the basis of currently measured sensor data and/or on the basis of the calculated setpoint data set.

The fast control loop is an inner control loop. In a preferred embodiment of the invention, no changes to the model (model update) are carried out or initiated during or after the execution of the fast control loop. The fast control loop is used for control, in particular for predictive control, of a first class of parameters. The first class of parameters preferably includes those parameters that have relatively low time constants (e.g. speed control) and can therefore be quickly adjusted or changed within the required control cycle times (preferably <1 ms). In principle, it is possible to configure in a configuration phase which parameters are assigned to the first class. The first class of parameters can include, for example, a cutting speed parameter, a parameter relating to the focal position, a parameter relating to the pulse pattern and/or a laser power parameter.

In a preferred embodiment, the "fast" or rapid control takes place on the basis of past (historical) and/or current sensor data.

In a further advantageous embodiment of the invention, the method can apply a slow control loop to a second class of slowly changing parameters, which controls the laser cutting process together with the feed rate of the laser head on the basis of currently measured sensor data and/or on the basis of the calculated setpoint data set. The second class of parameters has a high latency in the implementation of control or change, such as the change in gas pressure or the change in focal position. The gas pressure should conventionally lie in a range between 1 and 25 bar for fusion cutting and in a range around 0.5 bar for flame cutting.

The slow control loop is an outer control loop. The slow control loop is used for control, in particular for predictive control, of a second class of parameters. The second class of parameters is preferably those parameters which have relatively high time constants and can therefore only be slowly controlled or cannot be changed within the required control cycle times. For this second class, too, which parameters are to be assigned to the second class can be configured in a configuration phase. For example, the gas pressure and/or the focal position can be assigned to the second class of parameters.

In a preferred embodiment, the "slow" control takes place on the basis of current sensor data and model data (forecast or estimated data).

When controlling parameters of the second class, i.e. in particular parameters that have relatively high latency times, it is however also possible to control the parameters of the first class (at the same time).

In a further advantageous embodiment of the invention, the fast and/or the slow control loop can be designed as a predictive model-based controller (MPC). At least the slow control loop is preferably implemented as an MPC controller. If the fast control loop is also implemented as an MPC controller, the respective computing unit is provided with sufficient computing power.

The predictive, model-based controller, also referred to as MPC controller, can predict (estimate) the laser cutting process and/or the movement process of the laser head via the respective model behaviour up to a certain time horizon. Only the input signal with the respective machine or process parameters can be used for the next time step and then the optimization can be repeated. The optimization is carried out in the next time step with the then current (measured) state via the acquired sensor signals, which can be understood as feedback and, in contrast to open-loop optimal controls, turns the MPC into a closed-loop controller. This allows disturbances to be taken into account.

In a further advantageous embodiment of the invention, the process model and/or the dynamic machine model can be calibrated on the basis of sensor data of the carried-out laser cutting process that have been read in and fed back to the respective model. This has the advantage that the respective model can be continuously improved by subjecting it to an update operation. Kalman filters can preferably be used here.

Alternatively or cumulatively, it is possible for deviations between the (estimated) values calculated by the model and the actual measured values to be reduced by direct readjustment of the corresponding process variables. If, for example, a kerf width of 200 µm is to be achieved, but sensors (for example, a camera, inter alia) detect that the kerf width is actually 180 µm, the 20 µm deviation can be corrected automatically. This can be set via the focal position and/or by adjusting the nozzle spacing. This correction value is superimposed on the value output by the model using the following formula:

$$\text{Focus}_{SETPOINT,ACTUAL} := \text{Focus}_{SETPOINT} +/- \text{Focus}_{CORRECTION},$$

wherein the value or the input of $\text{Focus}_{SETPOINT}$ was calculated (or estimated) by the model.

In a further advantageous embodiment, the first memory and the second memory can be integrated together in a single electronic unit or in a common component. This has the advantage that the electronic unit can be made slimmer or simpler overall. Alternatively, the first memory and the second memory can also be designed in separate structures. This has the advantage that the respective models (machine model, process model) can also be changed independently of one another and in particular during access to the respective other model (model update).

It is conventionally provided that the process model and the machine model are designed as two separate models and are readjusted or calibrated independently of one another. Alternatively or cumulatively, the process model and the dynamic machine model can be integrated into a combined model so that the control unit can access it in one step. The performance of the method can thus be improved.

In an advantageous further embodiment, after the start of the method while it is being carried out, setpoint values are continuously calculated as a function of the point in time and/or the position on a trajectory.

In an advantageous further embodiment, control of the laser cutting process is carried out jointly and/or in comparison with control of a feed rate of the laser head by means of the spatially and time-resolved, combined setpoint data set, wherein when calculating the spatially and time-resolved, combined setpoint data set, user inputs or specifications or defaults, respectively, which can be acquired, for example, via a user interface, are taken into account.

The inputs or specifications can relate, for example, to inputs relating to the robustness of the cutting process and/or inputs relating to the quality of the cutting process.

In a further advantageous embodiment, the process model and/or the machine model and/or update data for the respective models can be collected, in particular on a central server, from geographically distributed laser cutting systems for calibrating the process model and/or the machine model. This can improve the overall system and overarching model structures.

The achievement of the object has been described above in terms of the method. Features, advantages, or alternative embodiments mentioned in this way can also be applied to the other claimed subjects and vice versa. In other words, the present claims (which are directed, for example, to a laser cutting system or to a computing unit) can also be further developed with the features described and/or claimed in connection with the method. The corresponding functional features of the method are thereby formed by corresponding physical modules, in particular by hardware modules or microprocessor modules, of the system or of a computer product, and vice versa.

According to a further aspect, the invention relates to a control unit for calculating a spatially and time-resolved, combined setpoint data set for open- and/or closed-loop control of a laser cutting process during laser cutting, in particular the laser cutting of metal sheets or tubes, with a laser cutting machine, with:
- a measurement data interface to at least one sensor for measuring sensor data during the cutting operation;
- a process interface to a first memory in which a process model is stored which represents and/or models the laser cutting process and estimates status data of the laser cutting process and in particular a cutting result resulting therefrom;
- a machine interface to a second memory in which a machine model is stored which represents and/or models the kinematic behaviour of the laser cutting head during movement thereof and estimates status data of a movement process and in particular the cutting result resulting therefrom;
- a processor which is intended to execute an algorithm which couples the process model and the machine model, in particular couples via a feed rate value and/or via a nozzle spacing value;
- wherein the processor is furthermore intended to access the process model in the first memory via the process interface and to access the machine model in the second memory via the machine interface in order to obtain the spatially and time-resolved, combined setpoint data set based on the estimated status data of the laser cutting process and the movement process with coordinated setpoints for the laser cutting process and setpoints for the movement process, taking into account the read-in sensor data.

In a preferred embodiment, the at least one sensor can be designed as follows, in particular as:
- a camera,
- a spectral intensity sensor,
- a gas pressure sensor,
- a gas flow sensor,
- a sensor for detecting the laser power,
- a sensor for detecting a beam shape of the laser,
- sensors for mechanical subsystems, in particular a sensor for detecting a focal position, a cutting speed, a nozzle spacing,
- acceleration sensors, especially for the cutting head, sheet metal and/or machine axes,
- temperature probe for detecting the temperature of the cutting gas, a cutting environment, a workpiece to be cut, the drives,
- humidity sensors for detecting the humidity of the cutting gas and/or an environment, sensors for detecting a temperature distribution of the melt and/or
- acoustic sensors for measuring acoustic emissions during cutting.

In a preferred embodiment, the sensors or a combination of the aforementioned sensor types can be selected. The selection can be carried out in particular according to the availability of the sensors and/or according to the use for the setpoint calculation.

In a further aspect, the invention relates to a laser cutting system, in particular for cutting metal sheets or tubes, having:
- a control unit for calculating a spatially and time-resolved, combined setpoint data set for open- and/or closed-loop control of a laser cutting process as described above and
- a laser cutting machine with a movable laser cutting head which is moved and operated by means of actuators and/or drives along a trajectory according to the setpoint data set calculated by the control unit.

In a preferred embodiment, the laser cutting system can include a user interface. For example, inputs for the required cutting quality and/or the desired cutting speed can be acquired via the user interface, which are taken into account when calculating the spatially and time-resolved, combined setpoint data set and thus when controlling the laser cutting process.

The method is preferably implemented by a computer. All or selected method steps can be carried out by a computer program on a computer unit with a processor (CPU, GPU, etc.). The measurement of sensor data can be carried out using suitable sensors of different types (optical, acoustic and/or other types of sensors). Depending on the type of measured signals, an A/D converter can be used to convert the analogue signals into digital signals. The measurement of sensor data can thus also comprise reading in digital signals.

Another way of achieving the object provides a computer program, with computer program code for performing all the method steps of the method described in more detail above when the computer program is executed on a computer. It is also possible that the computer program is stored on a computer-readable medium.

DESCRIPTION OF ADVANTAGEOUS EMBODIMENTS IN CONNECTION WITH THE FIGURES

Figure 1:
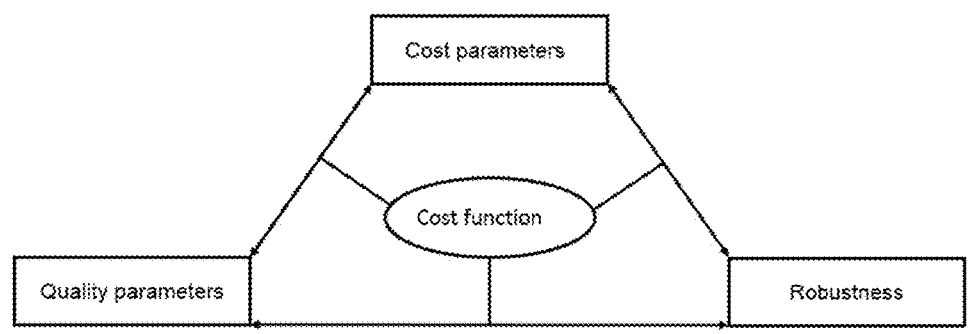
FIG. 1 shows a schematic representation of three cost functions that can be entered on a specifically designed button of a user interface according to a preferred embodiment of the invention.

The invention relates, inter alia, to a method for calculating a spatially and time-resolved, combined setpoint data set for open- and/or closed-loop of a laser cutting process during laser cutting with a laser cutting machine L. The laser cutting process is characterised by different variables. Different target inputs can be specified for execution of the laser cutting process. For example, it can be specified that the efficiency or productivity of cutting should be maximized as far as possible. This means that as many parts as possible should be cut from the workpiece in a unit of time. Another target input can, for example, be maximizing quality. A further target input can, for example, relate to the robustness of the cutting process.

In the following description of the figures, the reference sign L denotes the laser cutting machine. This includes a laser with a laser cutting head that is moved and operated using known mechatronic components (e.g. a bridge).

The invention is based on the use of two models or a combination thereof.

1. Process model PM: The process model estimates the resulting quality (e.g. burr) of the cut part T. The optimizer finds process parameters that meet the quality requirements. The process and machine model are directly linked to one another (e.g. via the feed rate (cutting speed) and the nozzle spacing). The process model is used to estimate the quality of a cut part T. The cutting parameters are optimally set based on the estimate. The quality criterion of the optimization (cost function) can be weighted differently between robustness, productivity and quality (see FIG. 1 below). In contrast to other methods, which also find optimal process parameters (e.g. using AI, model) but only overall for an entire part, the process parameters according to the present proposal are locally optimal, i.e. available every millisecond. (Coupling between process model and machine model). In the prior art, the optimal process parameters were only available generically and uniformly for the cutting process of a part to be cut, and process parameters optimized differently cannot be calculated for one and the same part. However, this is possible with the present invention.

2. Machine model MM: A highly dynamic movement can cause high contour errors, which can be estimated and compensated with the help of a dynamic machine model. Alternatively, the dynamics are reduced in order to meet tolerance requirements. The machine model estimates contour errors that result from the inertia or flexibility of the machine components. Contour errors are particularly pronounced when, for example, high dynamic limits are used. Based on this estimate, either contour errors can be reduced or productivity can be increased (through higher dynamic limits). Through contour error estimation using a machine model the information as to whether the component tolerances are being complied with is obtained during cutting
contour errors can be reduced and
higher dynamic limits (productivity increase) can be used because the higher contour errors can be compensated.

The feed rate (setpoint speed) cannot be achieved in corners, for example (dynamic limits of the machine), which is why the optimal parameters for the part to be cut do not apply in the corner. For this purpose, the process model PM is used to react to the change in speed. With this control, an MPC approach can advantageously be pursued which is based on estimation calculations and thus can react in advance (prediction horizon) to speed reductions or more generally to speed changes. If it is only possible to react to the currently available speed (as in the prior art), this is associated with the following disadvantages: the various delays of focal position, speed, gas pressure, laser power as well as the pulse pattern of the nozzle spacing, BPP (beam parameter product) and focal diameter (magnification) may possibly be insufficiently compensated. For example, the focal position may not be adjusted quickly enough due to a rapid reduction in speed (the dynamics of the focal position are lower than the dynamics of the machine axes which specify the cutting speed). The above-mentioned deviations from NOMINAL are indicated (predicted) according to the invention and changes to the settings can thus be triggered in advance so that these deviations do not arise.

One advantageous effect can be seen, among other things, in the fact that the sensor feedback is integrated into the setpoint calculation of a control unit, in particular an MPC controller. Calculation may thus alternatively, or cumulatively in terms of estimates of process model states, be based on measured values. Compared to the open-loop methods of the MPC controller (with and without model update), higher model deviations can be managed.

The models PM, MM can be used over the complete machine life cycle. Tracking model deviations contributes to predictive maintenance.

Figure 8:
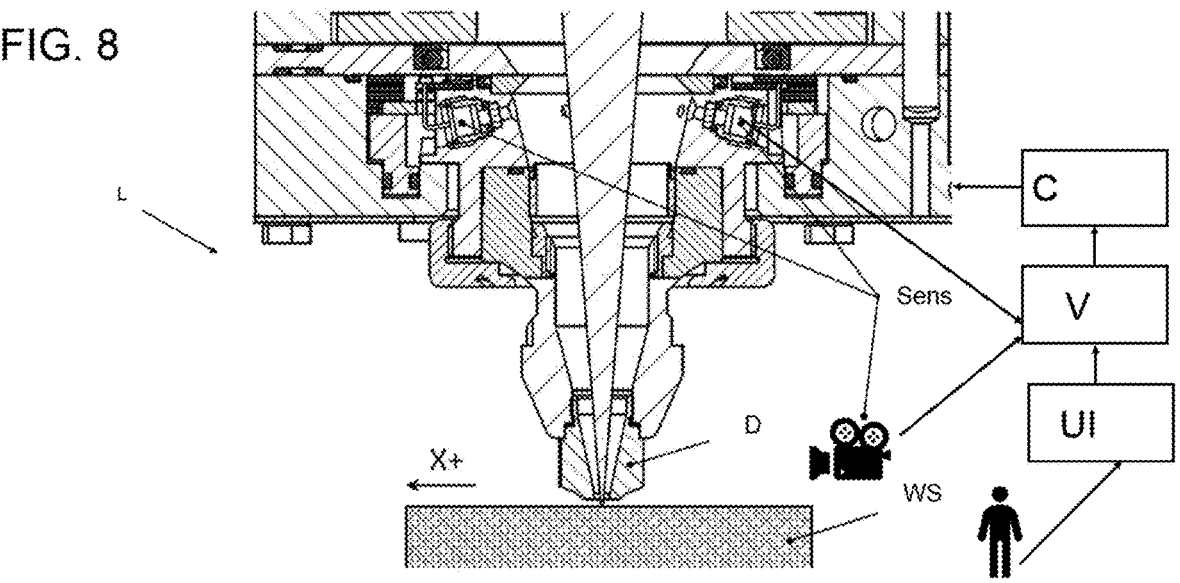
FIG. 8 is a schematic overview figure of the laser cutting system according to a preferred embodiment of the invention.

FIG. 8 shows, in schematic representation, a laser cutting head with a nozzle D of a laser cutting machine L, which is driven or controlled by a controller C (indicated by the arrow) in order to cut a workpiece WS. As can be seen, the laser cutting head comprises a large number of mechanical or mechatronic and/or physical components that influence the total mass and are taken into account according to the invention during movement (e.g. as marked here in the figure with direction X+). The sensors Sens can be arranged inside the laser system and/or outside it and supply sensor data for further calculation. The sensor data can, for example, as shown in FIG. 8, be transmitted to the controller C via a switching node V in a data network. In addition, a user interface UI can be provided on which the user can make entries, in particular for the cost function (see FIG. 1). As shown in overview in FIG. 8, a control unit RE and/or a processor P can be implemented in a machine control of the laser cutting machine L, which can be implemented, for example, as a two-stage predictive controller. "Two-stage" refers to implementation being divided between a fast control loop srk and a slow control loop lrk. The term 'predictive' is used because the calculation is forward-looking and therefore predictive. This solution reduces computational effort and susceptibility to modelling errors. The control unit RE can be implemented on the controller C.

The slow control loop determines the setpoints in such a way that the process result is optimal in relation to the desired requirements. This control loop receives information about the extent to which the models (process model PM and machine model MM) have to be adjusted to the current conditions.

The fast control loop changes setpoint values that can be changed quickly in such a way that the process result/process variable estimated and/or directly measured on the basis of measured variables is as close as possible to the desired process result/process variable. The process model PM and/or the machine model MM are also used.

The process model PM and/or the machine model MM can be updated by comparing measured and estimated variables (e.g. Kalman filter).

FIG. 1 shows different cost function blocks (3 in this example, but even more parameters or blocks can be determined and taken into account) which are determined as a function of the selected target inputs. The target inputs can preferably be entered on a user interface UI in a specifically designed switch field. As shown in FIG. 1, the different target inputs are dependent on one another. For example, it is obvious to a person skilled in the art that a target input for maximizing quality is generally also associated with a reduction in productivity and/or can lead to higher gas consumption. The button of the user interface is therefore designed in such a way that the entry of inconsistent inputs can be ruled out or very largely avoided, for example it may take the form of several sliders, with the two or more other sliders being automatically changed accordingly when one slider is changed.

Figure 2:
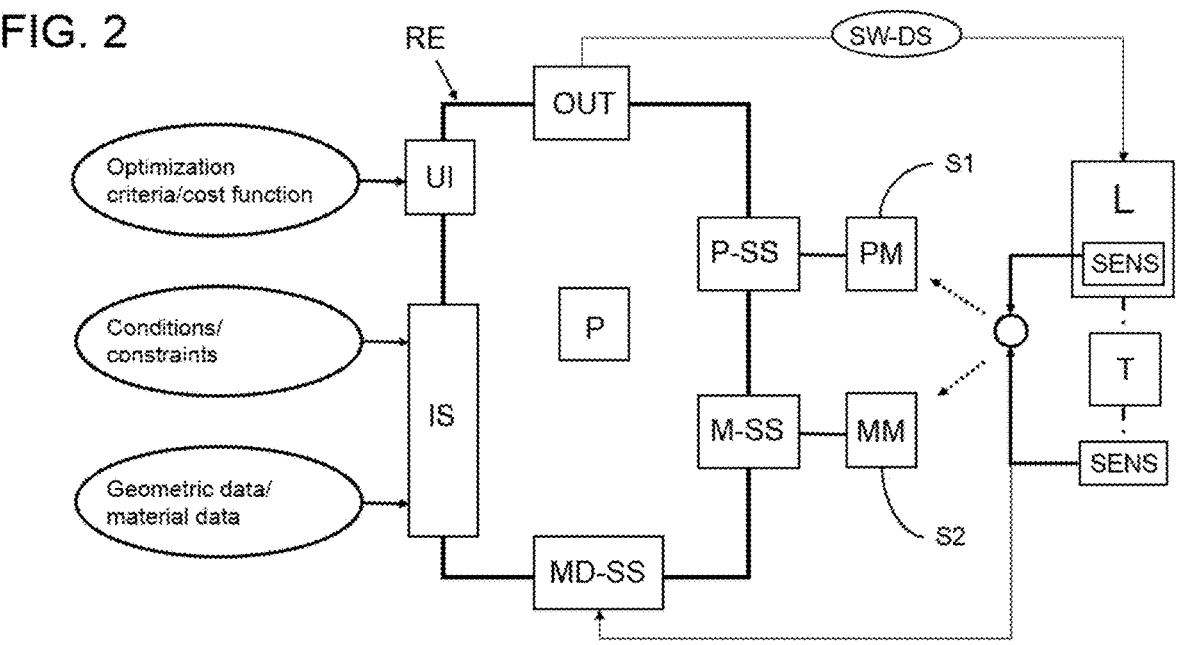
FIG. 2 is a representation of the overview type of a laser cutting system for cutting metal sheets and tubes, in the form of a block diagram, which is controlled with a control unit according to the invention and with externally stored models according to a preferred embodiment of the invention.

FIG. 2 shows a block diagram which shows an overview of the laser cutting system according to the invention in different variant embodiments.

A control unit RE is used to calculate the spatially and time-resolved, combined setpoint data set SW-DS. The control unit RE is preferably implemented on a computer unit, such as for example a workstation or a server or an electronic computer module connected to the laser cutting machine L (e.g. as an embedded device). As shown in the example in FIG. 2, the control unit RE can be supplied with different input variables for calculating the setpoint data set SW-DS. At least optimization criteria are acquired as input variables that have been entered, for example, on the user interface UI, which has been explained in more detail above in connection with FIG. 1. Furthermore, further conditions (constraints) for the calculation of the setpoint data set SW-DS as well as information on the geometry of the component to be cut or on the cutting plan can be read in via an input interface IS.

In the context of the constraints, which tolerances of the cutting contour are still acceptable can also be configured, for example.

The control unit RE can comprise a processor P on which an algorithm can be executed for calculating the setpoint data set SW-DS. For this purpose, the algorithm can access a process model PM, which is stored in a first memory S1, via a processor interface P-SS, and access a machine model MM, which is stored in a second memory S2, via a machine interface M-SS. In the exemplary embodiment shown in FIG. 2, the two models PM, MM are kept as separate models and are stored as external entities outside the control unit RE in the memories S1, S2. In other embodiments, the two models PM, MM can also be held and stored internally and within the control unit RE (for example in the exemplary embodiment shown in FIG. 3). The algorithm is designed to use the acquired input data (in particular the optimization criteria, the acquired constraints and the information on the cutting geometry) to access the two models PM and MM in a combined manner in order to calculate a spatially and time-resolved combined setpoint data set SW-DS for the respective application.

The two models are in a memory. When calculating the setpoint data set SW-DS, these two models are used with a memory access. Typically, the shape of the models does not change, though the parameters of the model (e.g. the mass) may do so. The models are available, for example, in the form of one or more algebraic equations or differential equations, which are then available as a common/complete model.

EXAMPLE $F(x,y)=0$ (process model individually) stored in a first memory area of the memory and
$G(x,z)=0$ (machine model, individually) stored in a second memory area of the memory.
$H(x,y,z)=[F(x,y), G(x,z)]=$combined model shares common states (e.g. speed and/or acceleration and/or nozzle spacing and/or ambient conditions (temperatures)).

For the sake of simplicity, the spatially and time-resolved, combined setpoint data set SW-DS is also simply abbreviated below as "setpoint data set SW-DS". The setpoint data set SW-DS calculated in this way can be transmitted via an output interface OUT directly to the laser cutting machine L for setting and/or controlling selected actuators ACT (for driving and/or setting the respective mechatronic components of the laser cutting machine L). The laser cutting machine L is then operated with the calculated data from the setpoint data set SW-DS. Sensor data, which can be fed back to the control unit RE for the purpose of improvement, are acquired via different types of sensors SENS. The sensors can be optical (camera, photodiode, etc.) and/or acoustic sensors and/or temperature sensors and/or further sensors SENS for detecting a kinematic and/or laser-cutting physical state. The sensors can be installed directly in the laser cutting machine L; however, they can also be used in an external and/or a mobile configuration, in order to detect a cutting edge of a cut workpiece T, for example.

As indicated in FIG. 2 by the two dotted lines, the acquired sensor data of the sensors SENS can also be directly forwarded-starting from the laser cutting machine L via an intermediary node not shown in any more detail in FIG. 2 (the circle represents a computing unit that is assigned to the laser cutting machine L or can be implemented thereon) to the two models PM, MM—to the process model PM and/or to the machine model MM for continuous quality improvement of the models. However, this feedback is only optional.

Figure 3:
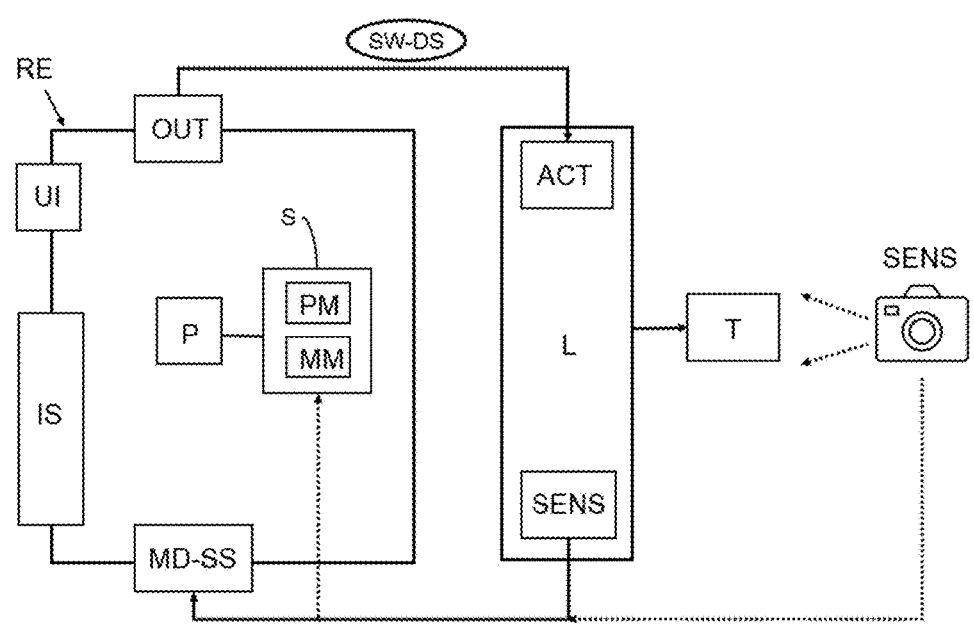
FIG. 3 is also a schematic representation of the laser cutting system that is controlled with the control unit and with an internally stored integrated model according to another advantageous embodiment of the invention.

FIG. 3 shows a further exemplary embodiment of the control unit RE, in which the two models, the process model PM and the machine model MM, are stored and held together in a memory S. The algorithm therefore only has to access the memory S once in order to address a single model, a combination of the process model PM and the machine model MM. As already explained in more detail with reference to the exemplary embodiment of FIG. 2, the laser cutting machine L may comprise sensors SENS or external sensors may also be configured to acquire the cutting result at the cut component T. The sensor data acquired in this way are then fed back to the control unit RE.

In a first variant, the sensor data that are fed back are used in the control unit RE in order to reduce any deviations between the values estimated using the model PM, MM and the values actually measured. The values can be, for example, different process parameters, such as for example a kerf width, a slag temperature, a cutting front inclination, a discharge speed and/or a temperature distribution of the melt, a quality measure (e.g. edge roughness), a beam quality, an effective degree of absorption, information for the beam tool (size, focal point, focal position) and/or values for the dynamic state of the mechanical system (mass, size, speed, acceleration, jerk etc.).

In a second variant, the sensor data fed back can be used in the control unit RE in order to optimize or calibrate the process model PM and/or the machine model MM.

Figure 4:
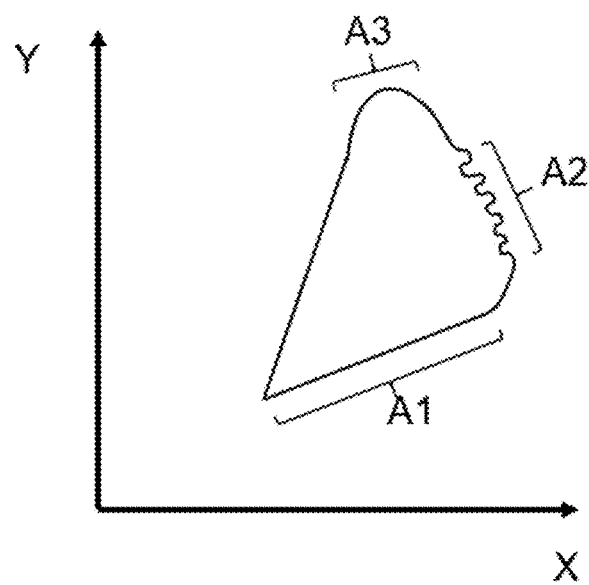
FIG. 4 shows an exemplary representation of a sectional contour with different radii and trajectory sections, for each of which different setpoint data sets are dynamically calculated and which are correspondingly traversed with different setpoint data sets.

FIG. 4 shows an example of an outline for a component T to be cut with the dimensions in the X-axis and Y-axis. As can be seen in this example, the contour to be cut has straight portions and different sections with different smaller and larger radii. According to the invention, this geometry can be followed with different setpoint data sets SW-DS, which are adjusted to the respective geometry section. The geometry shown in FIG. 4 has, for example, a first section A1, which comprises a relatively long straight cut, a second section A2 with a sequence of small radii and a third section A3 with a large radius. The actuator ACT for the cutting head can be moved on the first section A1 at a higher feed rate than, for example, on the section A2, since it has to be moved more slowly here to comply with the specified quality standards in order to be able to cut the small radii with sufficient quality. According to the invention, depending on the point in time at which the cutting head is on a point of the geometry, different setpoint data sets SW-DS are calculated and used to control the actuators for the cutting head and possibly other components of the laser cutting machine L. Remaining with the above example, according to the invention, a first setpoint data set SW-DS1 is calculated for the first section A1, a second setpoint data set SW-DS2 for the second section A2 and a third setpoint data set SW-DS3 for the third section A3. Although "sections" are mentioned in the above description, the setpoint data set can be determined according to the invention for each individual point of the trajectory. The setpoint data set SW-DS calculated in this way is therefore spatially and time-resolved and is determined dynamically for the trajectory.

Figure 5:
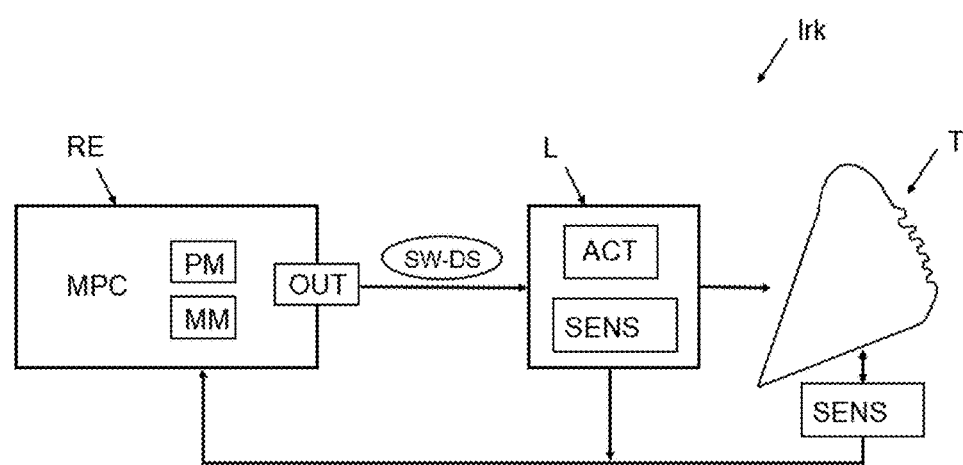
FIG. 5 is a schematic representation of a laser cutting system for cutting metal sheets and tubes, in which a processor unit is used to reduce model deviations with a slow control loop and optionally a fast control loop.

FIG. 5 shows an embodiment of the invention which is based on a slow control loop lrk. The slow control loop lrk is characterised in that sensor data that have been acquired, for example, by sensors SENS on the laser cutting machine L and/or in connection with the cut component T, are used to subject the models, in particular the process model PM and the machine model MM, to an update operation. The laser cutting machine L is open- or closed-loop controlled by at least one controller. The controller receives the setpoint data set for driving the cutting process. Since improving the models is very computationally intensive, it is important to ensure that sufficient resources (computational resources and time) are available for this operation. In a preferred embodiment, the control unit RE can comprise a predictive, model-based controller (MPC controller, model predictive control). Here, the sensor data that are acquired on the laser cutting machine L and/or in relation to the cut component T are thus fed back to the control unit RE (slow control loop). In addition, a fast control loop can optionally also be formed, which is explained in more detail below in connection with FIG. 6.

Figure 6:
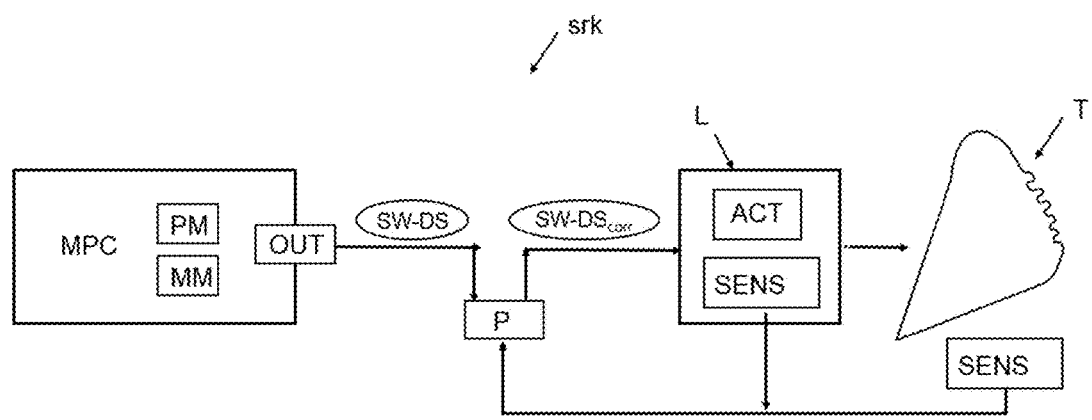
FIG. 6 shows a further schematic representation of a laser cutting system for cutting metal sheets and tubes, in which the processor unit is used to reduce model deviations with a fast control loop.

FIG. 6 shows the fast control loop srk in a further schematic drawing. In the fast control loop srk, the processor P or another computational entity is provided, which can be located outside the control unit RE and serves to reduce any deviations between the estimated model calculations and reality (with the measured values). If, for example, the model estimate specifies a kerf width of 150 μm but the sensor data record an actual kerf width of 170 μm, the processor P can be driven by means of an algorithm to activate selected actuators ACT, for example to change the focal position. As a result, the kerf width can be better predicted. In FIG. 6, the setpoint data set calculated by the model is identified by reference sign SW-DS and the setpoint data set corrected by the processor P is identified by reference sign $SW-DS_{CORR}$.

In principle, the machine model MM and/or the process model PM can be a state space model, in particular a linear state space model. The state space representation is one of several descriptions of a dynamic system. The state space model is considered to be a suitable engineering method for the analysis and synthesis of dynamic systems in the time domain and is particularly efficient in the control engineering treatment of multi-variable systems, linear or non-linear and time-variable transmission systems. All relationships between the input, output and state variables are represented in the form of matrices and vectors. The state space model is described by two equations, the first order state differential equation and the output equation. For further information, please refer to the entry en.wikipedia.org/wiki/State-space representation.

The following describes the use of the fast and slow control loops srk, lrk with a model update with reference to examples.

If, for example, the likelihood of tearing was incorrectly estimated, the (actual) tearing behaviour can be detected by photodiodes in the fast control loop srk, and the cutting speed can then be reduced. Alternatively or cumulatively, the slow control loop lrk can be used. Deviating material properties, contamination, aging or deviations in the production of the machine lead to a lower or higher possible cutting speed. This deviation is taken into account for the following cuts; the cutting speed is reduced/increased within the model.

If, for example, the contour errors are actually higher than estimated, then the slow control loop lrk can be used. With the help of the acceleration sensor, the contour error of the cut part can be better estimated. Adjustment of acceleration or jerk to reduce machine model deviation takes place with a slight time delay. The equations of the machine model are adjusted. Routines for calibrating the model can be used (model update). In the case of a model update of a linear state space model (see above, state space model), for example, the matrices A, B and D would be adjusted, with matrix A being the system matrix or state matrix (with the coefficients of the state variables), matrix B being the input matrix and matrix D being the feed forward matrix.

If the kerf width was incorrectly estimated, the slow control loop lrk can be used. The actual kerf width is calculated from the camera images. A correction value for the focal position can be calculated in order to obtain the desired kerf width. Deviations in the production of the machine lead to slightly different actual focal positions (with the same settings). In addition, effects such as thermal focus shift have a direct effect on the actual focal position, which essentially determines the kerf width. Thermal focus shift depends, for example, on the contamination of the optical components. According to the invention, this deviation is taken into account in the process model PM and an offset value ($SW-DS_{CORR}$) for the focal position is calculated and set.

If, for example, the burr height is estimated incorrectly, the slow control loop lrk can also be used. With the help of AI, deep learning, Kalman filters, the actual burr height can be determined. Correction values ($SW-DS_{CORR}$) are calculated for the focal position and the gas pressure in order to achieve the desired burr height.

For example, if the inclination angle was incorrectly estimated, the slow control loop lrk can be used. The cutting front angle can be determined with the aid of the camera images. A correction value ($SW-DS_{CORR}$) for the cutting front angl is adjusted in the model.

If, for example, the temperature (distribution) was incorrectly estimated, the slow control loop lrk can be used. The temperature distribution is measured using a camera. If this is too high, the laser power is reduced. If the temperature is too low, the speed is reduced. The focal position or the gas pressure can also be corrected. Production-related deviations of the laser lead to different laser intensity profiles and correspondingly to different temperature distributions. The temperature (distribution) is adjusted in the model using a correction factor.

Figure 7:
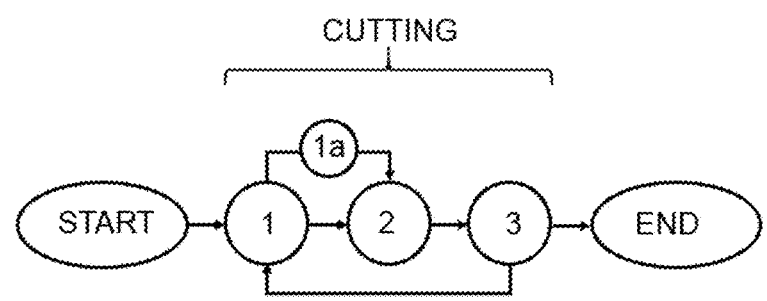
FIG. 7 is a flow diagram of the method for controlling the laser cutting process according to a first and an alternative embodiment of the invention.

FIG. 7 shows a flow chart of the method for open- and/or closed-loop control of the laser cutting method using dynamically calculated setpoint data sets SW-DS. During the laser cutting operation, in step 1, suitable sensors SENS are used to acquire and preprocess sensor data and, if necessary, supply said data to an A/D converter and process said data as a digital data set to calculate the setpoint data set SW-DS. In step 1 a, which is optional, target inputs can be entered on a user interface UI (for example cutting quality and/or cutting performance to be achieved). This input and/or possibly further "constraints" are then taken into account in the later calculation of the setpoint data set SW-DS. In step 2, a combined machine model MM and process model PM are accessed in order to calculate, in step 3, on the basis of the estimated status data of the laser cutting process and the movement process, the spatially and time-resolved, combined setpoint data set SW-DS with coordinated setpoints for the laser cutting process and setpoints for the movement process, taking account of the read-in sensor data. After the cutting operation has been completed, the procedure can be terminated. During the cutting operation, steps 1, 2 and 3 are carried out continuously in order to calculate a specific setpoint data set SW-DS for each point of the trajectory. Alternatively, as described above, steps 1, 2 and 3 can also be calculated before a laser cutting operation to determine the setpoint values or the setpoint data set for all points of the trajectory to be traversed, taking into account the influence of the moving masses.

The processor P can be integrated into the control unit RE or incorporated into the system as a separate entity via appropriate interfaces for data exchange. The processor P can have the function of reducing the deviations between the values estimated by the model PM, MM and the measured values on the basis of the acquired sensor data by outputting the corrected setpoint data set SW-DS$_{CORR}$.

A simplified implementation and execution of the invention consists in the machine model only generating setpoint values, taking into account boundary conditions, in particular the machine and its parameters, but without optimization (no error correction). This means that the cutting speed and/or acceleration can be set in such a way that the machine and its components (axes, drives, bearings, etc.) are not overstressed.

Finally, it should be noted that the description of the invention and the exemplary embodiments are not to be understood as limiting in terms of a particular physical realisation of the invention. All of the features explained and shown in connection with individual embodiments of the invention can be provided in different combinations in the subject matter according to the invention to simultaneously realise the advantageous effects thereof.

The scope of protection of the present invention is given by the following claims and is not limited by the features illustrated in the description or shown in the figures.

It is particularly obvious to a person skilled in the art that the invention can be used not only for settings of the process parameters mentioned by way of example, such as the focal position, but also for other process parameters. Furthermore, the components of the device or control unit can be produced so as to be distributed over a plurality of physical products.

The invention claimed is:

1. A method for calculating a spatially and time-resolved, combined setpoint data set for open- and/or closed-loop control and performing a laser cutting process of a laser cutting machine with a laser cutting head during laser cutting of metal sheets or tubes, the method comprising:

measuring sensor data during the laser cutting process, wherein the sensor data encode a measured cutting result of the laser cutting process;

providing a process model stored in a first memory which represents the laser cutting process and estimates first status data of the laser cutting process and a cutting result resulting therefrom, wherein the first status data of the laser cutting process include physical laser parameters during laser cutting, wherein the physical laser parameters at least include a feed rate value for the laser cutting head and/or a nozzle spacing value;

providing a machine model stored in a second memory which represents a kinematic behavior of the laser cutting head during movement thereof and estimates second status data of a movement process and the cutting result resulting therefrom, wherein the second status data of the movement process at least include the feed rate value for the laser cutting head and/or the nozzle spacing value;

wherein the process model and the machine model are coupled via the feed rate value for the laser cutting head and/or via the nozzle spacing value;

accessing the process model in the first memory and the machine model in the second memory by a control unit in order, on a basis of the estimated first status data of the laser cutting process and the second status data of the movement process, to calculate the spatially and time-resolved, combined setpoint data set with coordinated setpoints for the laser cutting process and setpoints for the movement process, taking into account the measured sensor data;

comparing model-estimated cutting results from the process model and the machine model with the measured cutting result to identify deviations, wherein the process model and/or the machine model is updated and the spatially and time-resolved, combined setpoint data set is recalculated at least in an event of deviations; and performing an open and/or closed loop control of the laser cutting process to reduce the deviations.

2. The method according to claim 1, wherein the method further comprises:

acquiring a target input entered on a user interface for calculating a cost function, on the basis of which the combined spatially and time-resolved setpoint data set is calculated, the target input comprising several interdependent inputs, including a cutting quality input, a cutting operation robustness input and a productivity input.

3. The method according to claim 1, wherein the combined spatially and time-resolved setpoint data set includes setpoint values for direct process variables and/or setpoint values for indirect process variables.

4. The method according to claim 3, wherein the direct process variables comprise cutting speed, acceleration of the laser cutting head, laser power, focal position, pulse pattern, nozzle spacing, gas pressure, beam parameter product/BPP, focal diameter and/or gap width, and wherein the indirect process variables comprise scattered radiation, gap width, inclination of a cutting edge, temperature distribution in a cutting zone and quality features, including edge roughness, scoring, burr, and/or contour accuracy.

5. The method according to claim 1, further comprising applying a fast control loop to a first class of quickly controllable parameters, wherein the fast control loop controls the laser cutting process together with the feed rate of the laser cutting head on the basis of currently measured sensor data and/or on the basis of the calculated setpoint data set and/or a setpoint data set corrected on the basis of the sensor data.

6. The method according to claim 5, wherein the fast control loop and/or a slow control loop are designed as predictive model-based controllers.

7. The method according to claim 1, further comprising applying a slow control loop to a second class of slowly changing parameters, wherein the slow control loop controls the laser cutting process together with the feed rate of the laser cutting head on the basis of currently measured sensor data and/or on the basis of the calculated setpoint data set.

8. The method according to claim 1, wherein the process model and/or the machine model is calibrated on the basis of sensor data of the laser cutting process carried out that have been read in and fed back to the respective model.

9. The method according to claim 1, wherein the first memory and the second memory are integrated together in a common unit.

10. The method according to claim 1, wherein the process model and the machine model are integrated in a combined model, so that access by the control unit takes place in one step.

11. The method according to claim 1, wherein setpoint values are continuously calculated from the spatially and time-resolved, combined setpoint data set as a function of a point in time and/or a position on a trajectory.

12. The method according to claim 1, wherein control of the laser cutting process takes place jointly and in comparison with control of the feed rate of the laser cutting head by means of the spatially and time-resolved, combined setpoint data set, wherein when calculating the spatially and time-resolved, combined setpoint data set, user inputs, which are acquired via a user interface, are taken into account.

13. The method according to claim 1, wherein the process model and/or the machine model and/or update data are collected on a central server from geographically distributed laser cutting machines for calibrating the process model and/or the machine model.

14. A control unit for calculating a spatially and time-resolved, combined setpoint data set for performing open- and/or closed-loop control of a laser cutting process during laser cutting operation with a laser cutting machine that includes a laser cutting head, with:
 a measurement data interface to at least one sensor for measuring sensor data during the laser cutting operation, wherein the sensor data encode a cutting result of the laser cutting process;
 the at least one sensor;
 a process interface to a first memory, wherein a process model is stored in the first memory, wherein the process model represents the laser cutting process and estimates first status data of the laser cutting process and a cutting result resulting therefrom, wherein the first status data of the laser cutting process include physical laser parameters during laser cutting, wherein the physical laser parameters at least include a feed rate value for the laser cutting head and/or a nozzle spacing value;
 a machine interface to a second memory, wherein a machine model is stored in the second memory, wherein the second model represents a kinematic behavior of the laser cutting head during movement thereof and estimates second status data of a movement process and the cutting result resulting therefrom, wherein the second status data of the movement process at least include the feed rate value for the laser cutting head and/or the nozzle spacing value;
 a processor configured to execute an algorithm which couples the process model and the machine model via the feed rate value for the laser cutting head and/or via the nozzle spacing value;
 wherein the processor is further configured to access the process model via the process interface and the machine model via the machine interface in order, on a basis of the estimated first status data of the laser cutting process and second status data of the movement process, to calculate spatially and time-resolved, combined setpoint data set with coordinated setpoints for the laser cutting process and setpoints for the movement process, taking into account the sensor data, wherein model-estimated cutting results are compared with the measured cutting result, wherein the process model and/or the machine model is updated in an event of deviations and recalculate the spatially and time-resolved, combined setpoint data set; and
 wherein the processor is configured to perform the open- and/or closed-loop control of the laser cutting process during laser cutting operation to reduce the deviations.

15. The control unit according to claim 14, in which the at least one sensor is selected from the group consisting of:
 a camera,
 a spectral intensity sensor,
 a gas pressure sensor,
 a gas flow sensor,
 a sensor for detecting a laser power, and for detecting a beam shape of the laser beam,
 sensors for mechanical subsystems including a sensor for detecting a focal position, a cutting speed, and/or a nozzle spacing,
 acceleration sensors for the cutting head, sheet metal and/or machine axes,
 temperature probes for detecting a temperature of a cutting gas, a cutting environment, and a workpiece to be cut,
 humidity sensors for detecting a humidity of the cutting gas and/or an environment,
 sensors for detecting a temperature distribution of melt, and
 acoustic sensors.

16. A laser cutting system, further comprising:
 the control unit according to claim 14, and a laser cutting machine, wherein the laser cutting head is movable and wherein the laser cutting head is moved and operated with drives along a geometry according to the setpoint data set calculated by the processor of the control unit.

* * * * *